UNITED STATES PATENT OFFICE.

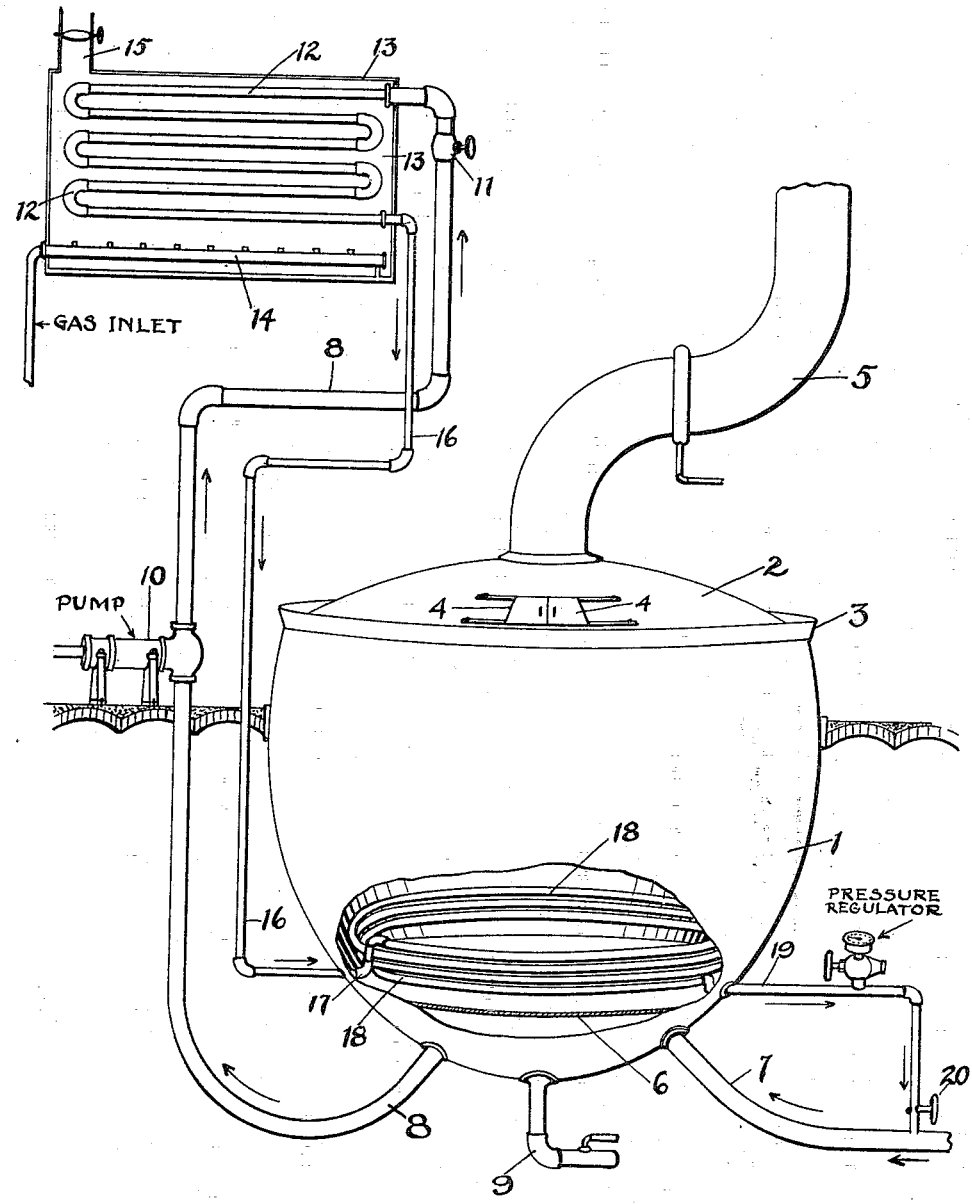

BENJAMIN A. KOPPITZ, OF DETROIT, MICHIGAN, AND PHILIP SHERRER, OF CLEVELAND, OHIO.

APPARATUS FOR BREWING BEER.

1,127,899.     Specification of Letters Patent.     Patented Feb. 9, 1915.

Application filed November 30, 1912. Serial No. 734,250.

*To all whom it may concern:*

Be it known that we, BENJAMIN A. KOPPITZ and PHILIP SHERRER, citizens of the United States, residing at Detroit, in the county of Wayne and State of Michigan, and Cleveland, in the county of Cuyahoga and State of Ohio, respectively, have invented a new and useful Improvement in Apparatus for Brewing Beer or the like, of which the following is a specification, the principle of the invention being herein explained and the best mode in which we have contemplated applying that principle, so as to distinguish it from other inventions.

Our invention relates as already stated to an apparatus for brewing beer or the like.

The conception has more particular reference to the mode of applying heat to the kettle, including the location of a heating element, and the degree of heat during different stages of the brewing operation.

The object of the invention is to effect both a caramelization of one or more of the ingredients, and a more rapid and earlier precipitation of others, whereby the following oft recognized advantageous results are effected, viz: 1. A fuller brew of more creamy consistency. 2. An amber colored and more aromatic brew. 3. A more readily and effectually pasteurizable solution. Added to these qualities, it may be furthermore noted that the wort will "break" very much better during the process of brewing and when this latter is concluded the solution is nearer what is commonly known as an old malt beer in respect to its flavor and palatableness.

The said invention consists of means which are hereinafter described and particularly pointed out in the claims.

The annexed drawing and the following description set forth in detail certain means embodying our invention together with a method for carrying out the same, the described means, however, constituting but one of various mechanical forms in which the principle of our invention may be applied.

The drawing is a diagrammatic view of an apparatus capable of carrying out our inventive process; certain parts being shown in section.

A modern type of circular kettle 1 is shown depressed beneath the flooring of the compartment in which the brewing operation is to be observed and controlled. This kettle has a cover 2 seated within an upwardly inclined annular flange 3 and the cover is provided with two sliding man-hole doors 4. A vent stack 5 communicates through the top of the cover as shown.

The kettle 1 is constructed with any suitable style of steam jacket, formed in this instance by a single horizontal partition 6, having an inlet pipe 7, outlet pipe 8 and a drain valve 9. The outlet pipe 8 is in turn provided intermediately of its ends with a discharge pump 10 while its remaining length after passing up through the flooring communicates with a valve 11 affording enforced communication when desired to some conventional superheating coil 12 arranged within the superheating oven 13. This oven has heat of a sufficient intensity supplied to it through the medium of the burner 14. The requisite flue 15 for the oven is represented above. The superheated steam outlet communicates with the pipe 16 which leads downwardly through the flooring to a connection 17 with a coil 18 disposed within the kettle proper. This superheating coil 18 is preferably near the bottom of the kettle though not actually contiguous thereto. It is provided with an outlet pipe 19 communicating with the atmosphere by means of a pressure reducing regulator, or back again if desired to the inlet 7 by opening the valve 20.

Assuming the customary amount of wort to have been already supplied to the kettle, steam from whatever source is permitted to enter the system at 7 with the valve 20 closed and the others open. In this manner not only is a double heating facility employed with a measurable factor of attendant economy, but one of the heating elements is wholly submerged. The burner 14 should in the meantime also have been lighted. The steam, likely in a saturated condition, first passes through the jacket 6 to eventually impart to it a temperature not greatly in excess of the average boiling temperature of the mixture where this in fact comprises the ingredients of wort or prospective beverage known as beer. Emerging at 8 the steam is projected onward by the pump 10 and compelled to enter the open valve 11 to the superheating oven 13. As indicated in this instance, its course of travel through the oven is on a zig-zag line in a downward direction. Upon issuing forth at a temperature several hundred degrees in excess of or nearly three times its condition as saturated steam, the superheated steam follows the prescribed route through the simple style of submerged coil 18 deemed sufficient for the illustrative purpose of this application. As must be obvious the mixture is thus brought to a boil far more rapidly than would be the case were only the ordinary steam jacket to be relied upon to transfer heat. We deem it conducive of the best results to maintain the boiling temperature with a very active "break" in fact just under the point of overflow. This is accomplished in the most satisfactory manner by the intermittent application of heat through the medium of the superheater coil.

In explanation of the pronounced change in chemical action which is effected by our rather simple conception, the following is appended: It has long been generally accepted as truth that a certain difference in chemical action resulting in different physical properties was attained, when brewing a wort in a kettle mounted over a fire pot, than was the case if such a mixture in identical proportions was brought to and held at boiling temperature by means of a steam heated jacket. A brew of finer quality in respect to density, flavor, aroma and other more technical characteristics results when a fire-box is depended upon. This was indeed the old method of supplying heat to the kettles and only came to be largely if not entirely abandoned in this country on account of the greater cleaning effort, space and expense required. On the European Continent the fire-box has been more generally retained despite the inconveniences just noted, and to this in part many attribute the universally conceded difference between German as contradistinguished for example from American beers. We have discovered that our process and apparatus attain the several desired attributes, on the theory that some specific point or points must offer a relatively greater heat intensity, whereby ever changing fluid films, as it were, are successively subjected to intense heat by contact with such point or points. This might be best illustrated by the general culinary knowledge that a different taste of a given foodstuff is experienced when it is cooked in a container itself in direct contact with a flame than if cooked in what is known as a double boiler. As more remotely pertinent though more readily perceived, a potato which has been baked in an oven could never have become similarly incrusted if placed in a dry inner container of such a double compartment, the outer of which incloses a fluid conducting medium.

The application of our process, by momentarily presenting specific surfaces of a very high degree of heat intensity with which the agitated wort must come in direct contact, very suddenly changes some of the ingredients specifically; the sugar in part to caramel while the albuminoids are more quickly precipitated. These changes together assist in effecting an enhanced malt-like taste and fulfilling the several objects of our invention as first enumerated.

While it is best to keep the wort at the maximum temperature short of an overflow, by means of the superheated coil; this, as earlier implied by the word "intermittent," can only be done by closely observing the amount of agitation and character of "break," necessitating at regular intervals a shutting-off of such superheated steam.

We have found however, and occasion is taken to remark it here, that the same beneficial results as to palatableness can be obtained, though to a less noticeable degree, when the wort is merely brought to a boil by superheated steam and thereafter kept so solely by the heat of the ordinary saturated steam jacket.

Having now fully described our invention, what we claim and desire to secure by Letters Patent is:

1. An apparatus for brewing beer or the like comprising the combination of a brewing kettle, a steam jacket for said kettle, a steam coil located interiorly of said kettle and adapted to be wholly submerged, means for supplying steam to said jacket, a superheater, a pump operatively connected between said jacket and superheater and adapted to project steam from the former into the latter, and a connection between said superheater and coil.

2. An apparatus for brewing beer or the like comprising the combination of a brewing kettle, a steam jacket below the bottom of said kettle and provided with an inlet and an outlet, means for passing steam through said jacket, a superheater coil disposed interiorly of said kettle and spaced from the walls thereof, a superheater oven connected with said coil and means including a pump and pressure regulator for passing superheated steam through said coil.

3. An apparatus for brewing beer or the like comprising the combination of a brewing kettle, a steam jacket for said kettle provided with an inlet and an outlet, means for supplying steam to said jacket inlet, a superheater connected with said jacket outlet and itself provided with an outlet, a conduit intersecting said kettle and communicating with said superheater outlet, said conduit being provided exteriorly of said kettle with a pressure regulator, and a pump for effecting the circulation of steam through said conduit.

4. In an apparatus for brewing beer or the like, a closed endless conduit system which includes a heating chamber, a second heating chamber adjacent the first, a duct connecting the discharge end of the first chamber with the intake end of the second, means for supplying steam to said duct, a superheater, a pipe connecting the outlet of said second chamber with the inlet of said superheater, a pump operatively connected with said pipe, a second pipe connecting the superheater outlet and the inlet of said first mentioned chamber and a kettle inclosing said chambers.

Signed by us, this 23rd day of November, 1912.

BENJAMIN A. KOPPITZ.
PHILIP SHERRER.

Attested by—
GEO. HERRMANN,
FREDERICK D. SCHNEIDER.

Copies of this patent may be obtained for five cents each, by addressing the "Commissioner of Patents, Washington, D. C."